United States Patent
Ryan et al.

(10) Patent No.: US 10,089,306 B1
(45) Date of Patent: Oct. 2, 2018

(54) DYNAMICALLY POPULATING ELECTRONIC ITEM

(75) Inventors: Thomas A. Ryan, Los Gatos, CA (US); Steven K. Weiss, Foster City, CA (US)

(73) Assignee: Amazon Technologies, Inc., Seattle, WA (US)

(*) Notice: Subject to any disclaimer, the term of this patent is extended or adjusted under 35 U.S.C. 154(b) by 2192 days.

(21) Appl. No.: 12/060,114

(22) Filed: Mar. 31, 2008

(51) Int. Cl.
*G06F 15/02* (2006.01)
*G06F 17/30* (2006.01)

(52) U.S. Cl.
CPC .......... *G06F 17/30* (2013.01); *G06F 15/0291* (2013.01)

(58) Field of Classification Search
None
See application file for complete search history.

(56) References Cited

U.S. PATENT DOCUMENTS

| | | | |
|---|---|---|---|
| 5,455,945 A * | 10/1995 | VanderDrift | |
| 5,524,201 A * | 6/1996 | Shwarts et al. | 715/763 |
| 5,566,098 A | 10/1996 | Lucente et al. | |
| 5,631,984 A * | 5/1997 | Graf et al. | 382/317 |
| 5,663,748 A | 9/1997 | Huffman et al. | |
| 5,745,360 A * | 4/1998 | Leone et al. | 715/236 |
| 5,799,157 A * | 8/1998 | Escallon | 705/26.8 |
| 5,802,292 A | 9/1998 | Mogul | |
| 5,847,698 A | 12/1998 | Reavey et al. | |
| 5,937,158 A | 8/1999 | Uranaka | |
| 6,082,776 A * | 7/2000 | Feinberg | 283/72 |
| 6,173,406 B1 | 1/2001 | Wang et al. | |
| 6,289,510 B1 | 9/2001 | Nakajima | |
| 6,363,418 B1 | 3/2002 | Conboy et al. | |
| 6,415,307 B2 | 7/2002 | Jones et al. | |
| 6,496,803 B1 | 12/2002 | Seet et al. | |
| 6,556,217 B1 | 4/2003 | Makipaa et al. | |
| 6,633,877 B1 * | 10/2003 | Saigh et al. | |
| 6,697,948 B1 * | 2/2004 | Rabin et al. | 726/30 |
| 6,766,362 B1 * | 7/2004 | Miyasaka et al. | 709/219 |
| 6,857,102 B1 | 2/2005 | Bickmore et al. | |
| 6,990,489 B2 | 1/2006 | Kondo et al. | |
| 7,009,596 B2 | 3/2006 | Seet et al. | |
| 7,298,851 B1 | 11/2007 | Hendricks et al. | |
| 7,304,635 B2 | 12/2007 | Seet et al. | |
| 7,590,681 B1 | 9/2009 | Chang et al. | |
| 7,669,121 B2 | 2/2010 | Kiilerich | |
| 7,886,226 B1 * | 2/2011 | McCoy et al. | 715/273 |
| 7,907,966 B1 | 3/2011 | Mammen | |
| 7,925,990 B2 * | 4/2011 | Bedingfield, Sr. | 715/808 |
| 7,996,882 B2 | 8/2011 | L'Heureux et al. | |

(Continued)

OTHER PUBLICATIONS

The PCT Search Report dated Aug. 12, 2011 for PCT application No. PCT/US11/35853, 8 pages.

(Continued)

*Primary Examiner* — Shih-Wei Kraft
(74) *Attorney, Agent, or Firm* — Lee & Hayes, PLLC

(57) ABSTRACT

Dynamically populatable electronic items are items that can be at least partially populated after creation. Dynamically populatable electronic items may include some static information (e.g., text, images, audio, video, etc.) and one or more dynamic fields, which are configured to be dynamically populated from a source separate from the electronic item. Thus, the content of the dynamic electronic item can change over time as the dynamic fields are populated and/or repopulated.

14 Claims, 9 Drawing Sheets

(56) References Cited

U.S. PATENT DOCUMENTS

| | | | |
|---|---|---|---|
| 8,346,660 B2 | 1/2013 | Reardon et al. | |
| 2001/0016851 A1 | 8/2001 | Gramsamer et al. | |
| 2001/0049635 A1* | 12/2001 | Chung | 705/26 |
| 2002/0034296 A1* | 3/2002 | Yoshimune et al. | 380/239 |
| 2002/0035697 A1* | 3/2002 | McCurdy et al. | 713/200 |
| 2002/0077985 A1* | 6/2002 | Kobata et al. | 705/51 |
| 2002/0090934 A1* | 7/2002 | Mitchelmore | 455/412 |
| 2002/0095538 A1 | 7/2002 | Marshall | |
| 2002/0099763 A1 | 7/2002 | Kondo et al. | |
| 2002/0133464 A1* | 9/2002 | Ress et al. | 705/51 |
| 2002/0138520 A1* | 9/2002 | Wakai et al. | 707/517 |
| 2002/0143822 A1 | 10/2002 | Brid et al. | |
| 2002/0152245 A1* | 10/2002 | McCaskey et al. | 707/530 |
| 2002/0152257 A1* | 10/2002 | Frolik et al. | 709/201 |
| 2002/0169700 A1* | 11/2002 | Huffman et al. | 705/35 |
| 2002/0174145 A1* | 11/2002 | Duga et al. | 707/513 |
| 2002/0194309 A1 | 12/2002 | Carter et al. | |
| 2003/0018663 A1 | 1/2003 | Cornette et al. | |
| 2003/0050931 A1 | 3/2003 | Harman et al. | |
| 2003/0061101 A1* | 3/2003 | Seet et al. | 705/14 |
| 2003/0069812 A1* | 4/2003 | Yuen et al. | 705/27 |
| 2003/0093336 A1* | 5/2003 | Ukita et al. | 705/26 |
| 2003/0093382 A1 | 5/2003 | Himeno et al. | |
| 2003/0140093 A1 | 7/2003 | Factor | |
| 2003/0149618 A1* | 8/2003 | Sender et al. | 705/14 |
| 2003/0182231 A1 | 9/2003 | Koike et al. | |
| 2003/0236917 A1* | 12/2003 | Gibbs et al. | 709/248 |
| 2004/0001087 A1* | 1/2004 | Warmus et al. | 345/745 |
| 2004/0015608 A1* | 1/2004 | Ellis et al. | 709/246 |
| 2004/0054915 A1 | 3/2004 | Jong et al. | |
| 2004/0078453 A1 | 4/2004 | Bhogal et al. | |
| 2004/0093279 A1 | 5/2004 | Yamanoue et al. | |
| 2004/0098284 A1* | 5/2004 | Petito et al. | 705/1 |
| 2004/0125140 A1* | 7/2004 | Bell et al. | 345/765 |
| 2004/0139400 A1* | 7/2004 | Allam et al. | 715/526 |
| 2004/0140975 A1 | 7/2004 | Saito et al. | |
| 2004/0153422 A1 | 8/2004 | Sakamura et al. | |
| 2004/0254851 A1* | 12/2004 | Himeno et al. | 705/26 |
| 2005/0012723 A1* | 1/2005 | Pallakoff | 345/173 |
| 2005/0027671 A1 | 2/2005 | Hind et al. | |
| 2005/0060266 A1 | 3/2005 | DeMello et al. | |
| 2005/0091672 A1 | 4/2005 | Debique et al. | |
| 2005/0138139 A1* | 6/2005 | Jain et al. | 709/217 |
| 2005/0188228 A1 | 8/2005 | DeMello et al. | |
| 2005/0246451 A1 | 11/2005 | Silverman et al. | |
| 2006/0015508 A1 | 1/2006 | Kondo et al. | |
| 2006/0036488 A1* | 2/2006 | Golan et al. | 705/14 |
| 2006/0050996 A1* | 3/2006 | King et al. | 382/312 |
| 2006/0064636 A1 | 3/2006 | Hua et al. | |
| 2006/0070012 A1 | 3/2006 | Milener et al. | |
| 2006/0149726 A1 | 7/2006 | Ziegert et al. | |
| 2006/0161538 A1 | 7/2006 | Kiilerich | |
| 2006/0167852 A1 | 7/2006 | Dissett et al. | |
| 2006/0184566 A1* | 8/2006 | Lo et al. | 707/102 |
| 2006/0184639 A1 | 8/2006 | Chua et al. | |
| 2006/0274869 A1 | 12/2006 | Morse | |
| 2006/0281058 A1 | 12/2006 | Mangoaela | |
| 2007/0005616 A1 | 1/2007 | Hay et al. | |
| 2007/0027887 A1* | 2/2007 | Baldwin | 707/100 |
| 2007/0053246 A1* | 3/2007 | Sano et al. | 369/30.04 |
| 2007/0074109 A1 | 3/2007 | Nagahara et al. | |
| 2007/0083810 A1 | 4/2007 | Scott et al. | |
| 2007/0118556 A1 | 5/2007 | Arnold et al. | |
| 2007/0118606 A1* | 5/2007 | Duncan et al. | 709/217 |
| 2007/0124671 A1* | 5/2007 | Hackworth et al. | 715/530 |
| 2007/0124781 A1* | 5/2007 | Casey et al. | 725/94 |
| 2007/0136337 A1* | 6/2007 | Sah et al. | 707/101 |
| 2007/0146812 A1* | 6/2007 | Lawton | 358/452 |
| 2007/0154876 A1 | 7/2007 | Harrison | |
| 2007/0201093 A1* | 8/2007 | Johnson et al. | 358/1.18 |
| 2007/0214237 A1 | 9/2007 | Stibel et al. | |
| 2007/0220419 A1 | 9/2007 | Stibel et al. | |
| 2007/0260671 A1* | 11/2007 | Harinstein et al. | 709/203 |
| 2008/0005263 A1* | 1/2008 | Baraev et al. | 709/217 |
| 2008/0007486 A1* | 1/2008 | Fujinawa et al. | 345/5 |
| 2008/0015933 A1* | 1/2008 | McKenna et al. | 705/14 |
| 2008/0046813 A1 | 2/2008 | Doatmas et al. | |
| 2008/0071561 A1 | 3/2008 | Holcombe | |
| 2008/0082911 A1 | 4/2008 | Sorotokin et al. | |
| 2008/0091796 A1* | 4/2008 | Story et al. | 709/217 |
| 2008/0120185 A1* | 5/2008 | Evans | 705/14 |
| 2008/0120538 A1 | 5/2008 | Kurz et al. | |
| 2008/0139191 A1 | 6/2008 | Melnyk et al. | |
| 2008/0180401 A1* | 7/2008 | Khedouri et al. | 345/173 |
| 2008/0183541 A1* | 7/2008 | Wenger et al. | 705/8 |
| 2008/0189608 A1* | 8/2008 | Nurmi | 715/273 |
| 2008/0270909 A1 | 10/2008 | Kaufman et al. | |
| 2009/0043755 A1* | 2/2009 | Faris et al. | 707/5 |
| 2009/0064184 A1 | 3/2009 | Chacko et al. | |
| 2009/0070413 A1 | 3/2009 | Priyadarshan et al. | |
| 2009/0094018 A1* | 4/2009 | Hu et al. | 704/4 |
| 2009/0187846 A1* | 7/2009 | Paasovaara | 715/780 |
| 2011/0167403 A1 | 7/2011 | French et al. | |

OTHER PUBLICATIONS

Office action for U.S. Appl. No. 13/902,717, dated Mar. 19, 2018, Weiss et al., "Dynamic Display Dependent Markup Language Interface", 35 pages.

U.S. Appl. No. 12/060,167, filed Mar. 31, 2008, Steven K. Weiss et al., "Dynamic Display Dependent Markup Language Interface".

Office action for U.S. Appl. No. 13/902,717, dated Jan. 11, 2016, Weiss et al., "Dynamic Display Dependent Markup Language Interface", 34 pages.

Office action for U.S. Appl. No. 13/902,717, dated Jan. 9, 2017, Weiss et al., "Dynamic Display Dependent Markup Language Interface", 38 pages.

Final Office Action for U.S. Appl. No. 12/828,011, dated Nov. 25, 2014, Mohar H. Bhise, "Providing Text Content Embedded with Multimedia Content", 49 pages.

Office Action for U.S. Appl. No. 12/828,011, dated Apr. 25, 2014, Mohar H. Bhise, "Providing Text Content Embedded with Multimedia Content", 43 pages.

Office action for U.S. Appl. No. 12/828,011, dated Apr. 6, 2016, Bhise et al., "Providing Text Content Embedded with Multimedia Content", 18 pages.

Office Action for U.S. Appl. No. 13/902,717, dated May 21, 2015, Steven Kenneth Weiss, "Dynamic Display Dependent Markup Language Interface", 29 pages.

Office Action for U.S. Appl. No. 12/828,011, dated Jul. 13, 2015, Mohar H. Bhise, "Providing Text Content Embedded with Multimedia Content", 37 pages.

Office action for U.S. Appl. No. 12/828,011, dated Jul. 18, 2013, Bhise et al., "Providing Text Content Embedded with Multimedia Content", 41 pages.

Final Office Action for U.S. Appl. No. 12/060,167, dated Aug. 17, 2012, Steven K. Weiss et al., "Dynamic Display Dependent Markup Language Interface", 11 pages.

Office action for U.S. Appl. No. 13/902,717, dated on Aug. 19, 2016, Weiss et al., "Dynamic Display Dependent Markup Language Interface", 26 pages.

Office Action for U.S. Appl. No. 13/902,717, dated Sep. 25, 2017, Weiss, "Dynamic Display Dependent Markup Language Interface", 35 pages.

Ziegert, et. al., "Device independent web applications: The author once: Display everywhere approach." Lecture notes in computer science (2004): pp. 244-255.

* cited by examiner

DYNAMICALLY POPULATING ELECTRONIC ITEM

BACKGROUND

Today it is effortless to distribute large, coherent units of information, such as books, using computers, networks, handheld devices, and other electronic technologies. Books distributed using electronic technologies are commonly referred to as electronic books or "eBooks." More generally, items distributed using electronic technologies are commonly referred to as electronic items.

Electronic books, audio books, musical recordings, movies, videos, multimedia presentations, and other electronic items are becoming increasingly popular. Typically, once electronic items are created, the content thereof is fixed or static. That is, every time a user consumes an electronic item, the content presented will be the same. For example, no matter how many times you read a book, listen to a recording, or watch a movie, the content will be the same. While the content may be presented in a different order (e.g., random playback) and/or portions of the content may be skipped or omitted (e.g., parental controls), the content of the electronic item remains the same.

Because the content of conventional electronic items is static, the electronic items may have limited entertainment value and/or may become out of date. Users may read a favorite book or watch a favorite movie multiple times, but eventually the interest will fade. Text books, documentaries, and other non-fiction works quickly become out dated and must be replaced with new updated editions. Musical recordings quickly go out of style. Thus, conventional static electronic items, just like their physical counterparts, have limited ability to retain the interest of users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, conventional electronic items are static in the sense that once they are created, the content remains the same for the life of the electronic item. Static electronic items have a limited ability to retain users' interest over time. After consuming content of a static electronic item a time or two, users often tire of the content. Also, in the case of text books or other non-fiction works, content may become out of date with the passage of time. One way to maintain users' interest in electronic items is to update or change content of the electronic items over time. This application describes various techniques of dynamically populating electronic items, so that the items remain fresh and new and retain user interest.

Dynamically populatable electronic items or "dynamic electronic items" generally include some static information (e.g., text, images, audio, video, etc.) and one or more dynamic fields, which are configured to be dynamically populated from a source separate from the electronic item. In some instances, dynamic items may be made up entirely of dynamic fields, and may be free of any static information. Thus, the content of the dynamic electronic item changes over time as the dynamic fields are populated and/or repopulated.

While electronic items are described throughout this description in the context of electronic books or eBooks, the concept of dynamically populating an electronic item is also applicable to other types of electronic items, such as audio books, musical recordings, movies, multimedia applications, and the like. For example, the application makes reference to dynamically populatable electronic books or "dynamic eBooks." However, the concepts described herein also apply to other types of dynamically populatable electronic items.

The terms "electronic book" and "eBook" are used synonymously and, as used herein, may include electronic or digital representations of printed works, as well as original electronic or digital content that may include text, multimedia, hypertext and/or hypermedia. Examples of eBooks include, but are not limited to, books, magazines, newspapers, periodicals, journals, reference materials, telephone books, textbooks, anthologies, instruction manuals, proceedings of meetings, forms, directories, maps, etc. Also, while various aspects and features are described herein as applied to an eBook reader, the concepts may be implemented in other electronic devices besides eBook reader devices including, for example, personal computers, portable computers (e.g., laptops or pocket PCs), personal digital assistants (PDAs), portable gaming devices, wireless phones, set-top boxes, and the like.

Illustrative Dynamic Living Book

Figure 1:
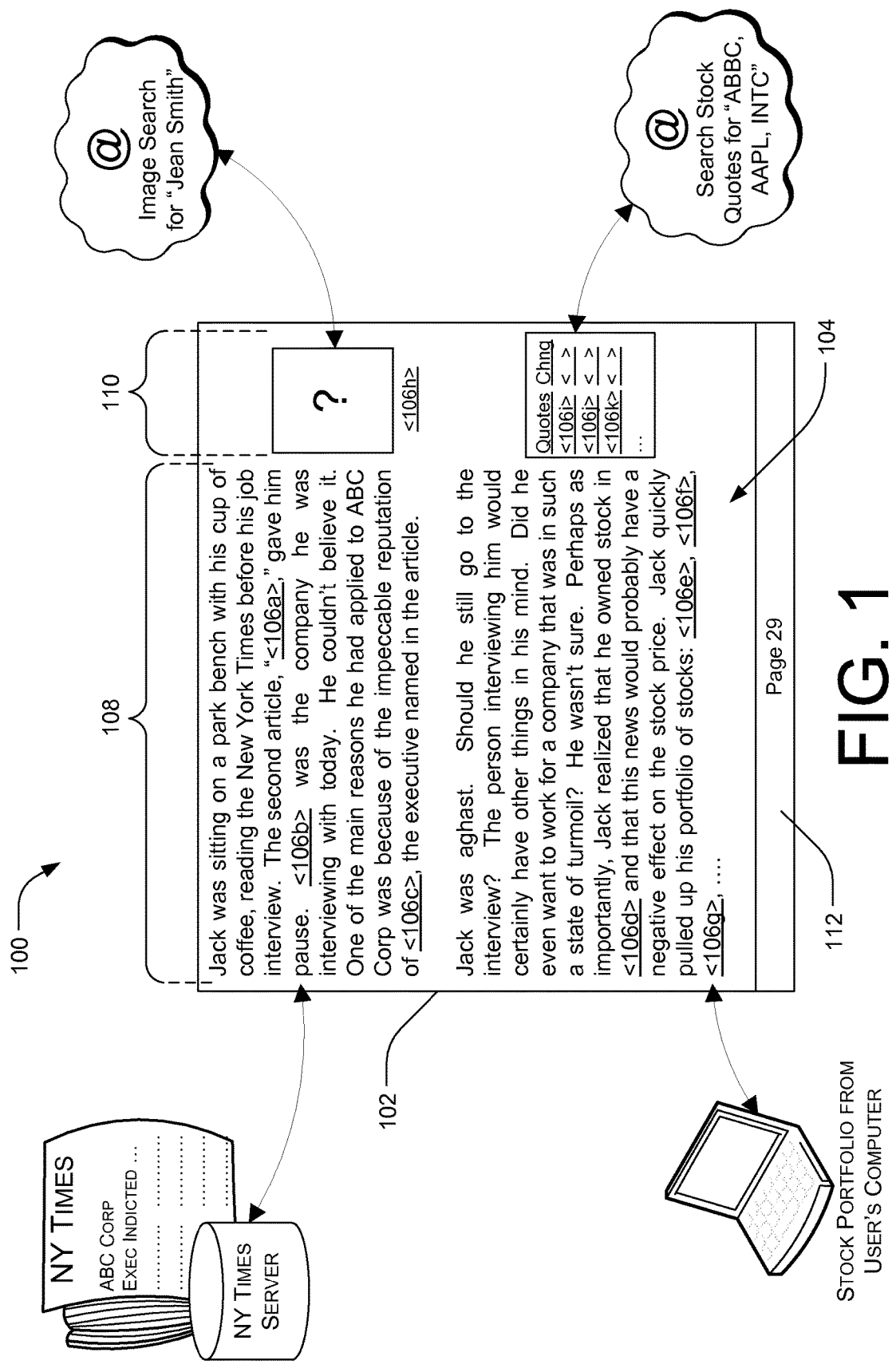
FIG. 1 is a schematic diagram of an illustrative dynamic electronic book with dynamic fields presented inline with static information, showing several sources of information from which it may be populated.
Figure 2:
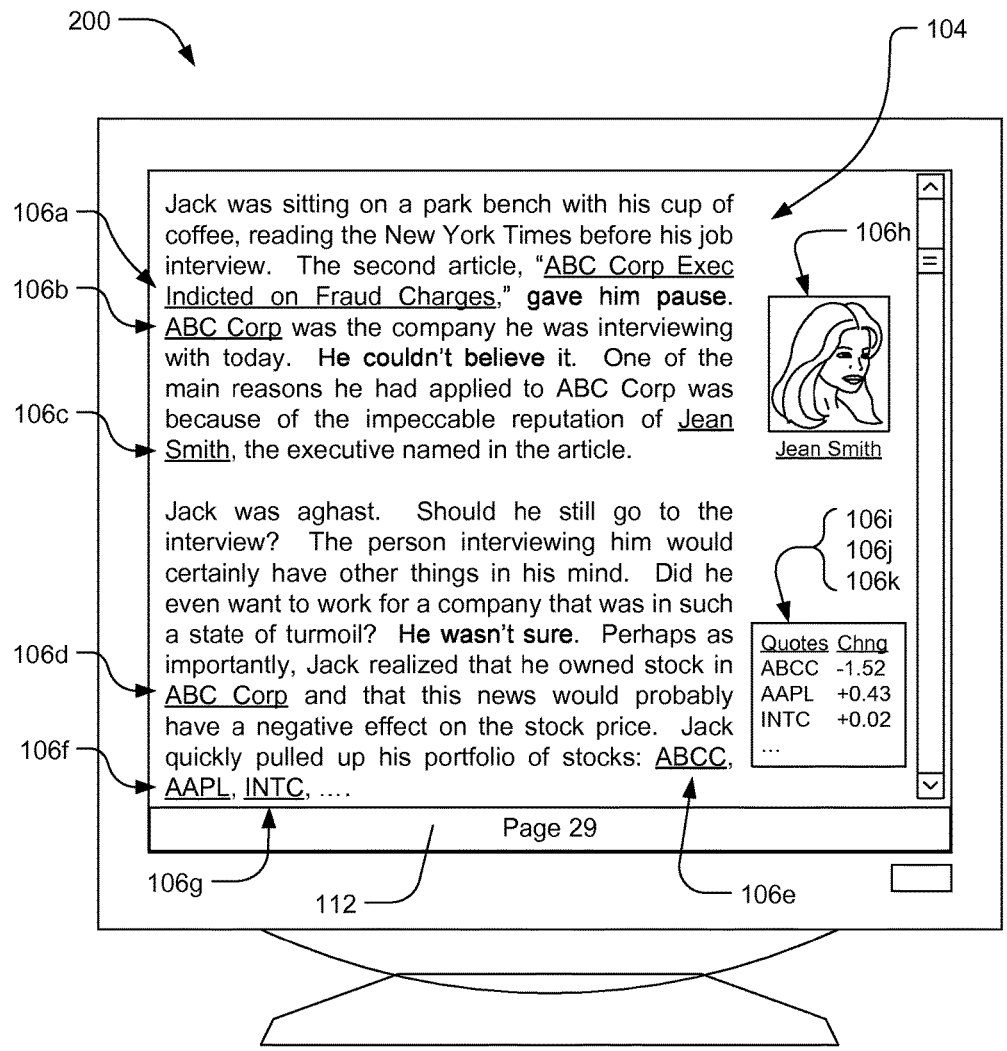
FIG. 2 is a schematic diagram of the illustrative dynamic electronic book of FIG. 1, presented on an electronic device.

FIGS. 1 and 2 depict a first illustrative dynamic electronic item 102 in a reader pane 100 of an electronic device. The dynamic electronic item 102 in this example is referred to herein as a "dynamic living book." FIG. 1 shows the dynamic living book before being populated and FIG. 2 shows the dynamic living book after being populated with information.

As shown in FIG. 1, the dynamic living book comprises static information 104 and one or more dynamic fields 106a-106k. The static information may include text, images, audio, video, and/or other information that remains the same over the life of the dynamic living book. In the illustrated example, the static information 104 comprises all of the plain text shown in a reader pane 100.

The dynamic fields 106a-k in this embodiment comprise placeholders or blanks inline with the static information 104 that are to be populated after creation of the dynamic living book by one or more information sources separate from the dynamic living book. Each dynamic field also includes a pointer to a source of information from which the respective dynamic field is to be populated.

The dynamic fields 106a-106k may also specify when they are to be populated and/or repopulated. For example, the dynamic fields specify that they are to be populated periodically (hourly, daily, weekly, monthly, yearly, or more or less frequently), upon the occurrence of an event (e.g., purchasing the dynamic living book, downloading the dynamic living book to the electronic device, opening the dynamic living book, displaying a page of content including the dynamic field, etc.), or a combination of these. Typically, eBooks are structured as virtual frames presented on a display device, and a user may turn or change from one virtual frame or "page" of electronic content to another. The term "page" as used herein refers to a collection of content that is presented at one time on a display.

In some instances, a number of times that the dynamic fields are to be populated may be limited (e.g., only populate the dynamic field three times, only populate the dynamic field while a user subscribes to the updates, etc.), while in other instances, the dynamic fields may be populated an unlimited number of times. Moreover, the number and timing of populating the dynamic fields may be the same for all dynamic fields or may vary from one dynamic field to another.

The static information 104 and the dynamic fields 106 are laid out and formatted according to a layout of the dynamic living book. The layout generally defines the font size and type, justification, margins, number and size of columns, location of images, resolution, and the like, of the dynamic living book. The layout may also define relative positions of the static information, dynamic fields, text, images, video, etc. For example, in the layout shown in FIG. 1, text is presented in a single column 108 on the left side of the reading pane 100, while images are presented in a column 110 on the right side of the reading pane 100. Dynamic fields 106a-106k are interspersed throughout the static information in both left and right columns 108, 110.

An information pane 112 may also be presented to aid the user in navigating through the dynamic living book. The information pane 112 in the illustrated embodiment shows the reader's location within the dynamic living book by page number (page 29). In other embodiments, the navigation pane may include a location number, a chapter number, a paragraph number, a progress bar, elapsed reading time, reading rate, an indication of when the dynamic fields were last populated, or any other information that may be of interest to the user of the dynamic living book.

FIG. 2 shows the dynamic living book after the dynamic fields have been populated, displayed in the reading pane 100 of a computer 200. As shown in FIG. 2, the dynamic field 106a is populated with a headline from today's issue of the New York Times (i.e., the day the dynamic living book is being consumed). Dynamic field 106b and 106d are populated with a company name from the headline retrieved in dynamic field 106a. Dynamic field 106c is populated with a name of an employee of the company retrieved in dynamic field 106b. Dynamic fields 106e, 106f, and 106g are populated with symbols of stocks from the user's portfolio retrieved from a program on the user's computer 200. Dynamic field 106h is populated with an image of the employee in dynamic field 106c retrieved from the Internet using an image search. Dynamic fields 106i, 106j, and 106k are populated with stock tickers corresponding to the stock symbols in fields 106e, 106f, and 106g, respectively.

The dynamic fields may be populated from any number of different sources of information, such as by searching the Internet, by querying a specialized data store of dynamic content for the dynamic living book, by searching other local or remote items accessible to the computer 200, from recent user search queries, from recent search results, from user preference information, from tag data, from combinations of any of these, or the like.

Thus, the dynamic living book will change as the sources of information change and are updated. In the illustrated example, the dynamic loving book will change depending on the headlines in the New York Times, the information stored on the user's computer, and results of an image search. However, in other examples, the dynamic living book may obtain information from any number of other sources of information.

Illustrative Book of all Things

Figure 3:
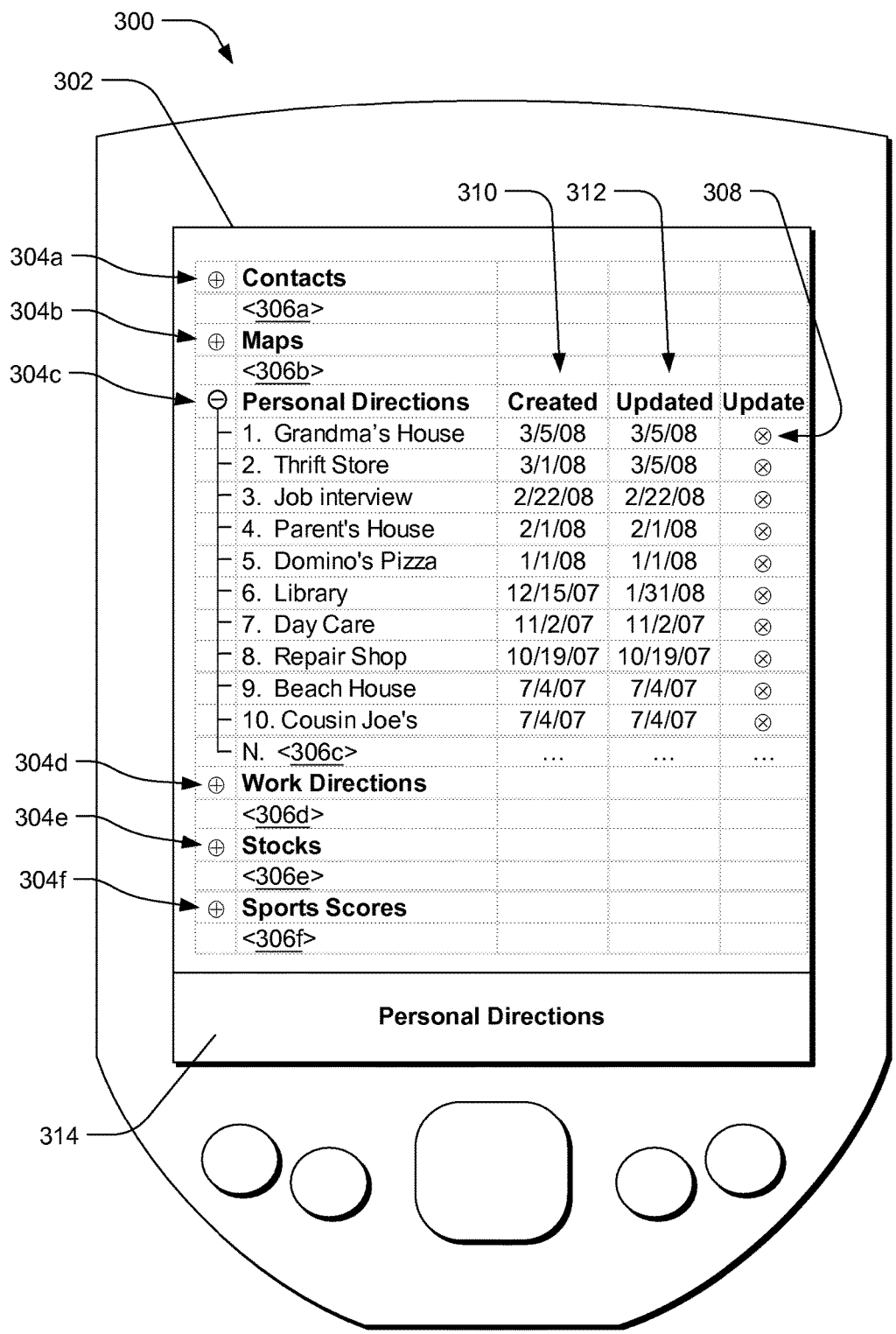
FIG. 3 is a schematic diagram of an illustrative dynamic electronic book presented on another electronic device, with dynamic fields presented according to a layout. Information in the dynamic fields may be stored in a repository prior to repopulating the dynamic fields.

FIG. 3 depicts an electronic device, in the form of a personal digital assistant (PDA) 300, presenting a second illustrative dynamic electronic item in a reading pane 302 of the PDA 300. The dynamic electronic item in this example is referred to herein as a "book of all things." The book of all things includes static information (illustrated by bold text in FIG. 3) and dynamic fields laid out according to a layout. In this example, the static information includes expandable headings 304a-304f. Under each expandable heading 304a-304f are one or more dynamic fields 306a-306f, which are configured to be populated from one or more information sources separate from the book of all things. In this example, once information is populated in the dynamic fields 306a-306f, the information is also stored in a content repository (not shown in this figure) prior to repopulating the dynamic field. Thus, the book of all things will grow as the dynamic fields are repopulated.

In the illustrated example, the static information includes a Contacts heading 304a, a Maps heading 304b, a Personal Directions heading 304c, a Work Directions heading 304d, a Stocks heading 304e, and a Sports heading 304f. Under each of these pieces of static information 304a-304f is a dynamic field 306a-306f. Once the dynamic field has been populated at least once, the information from the dynamic field is stored in the content repository and a new dynamic field is added below the respective heading. For example, as shown in FIG. 3, the dynamic field 306c under the Personal Directions heading 304c has been populated ten times. Thus, the Personal Directions heading 304c now has ten entries. After being populated each time, the information from the dynamic field 306c is also copied to the content repository.

Each dynamic field 306a-306f also includes an update icon 308, which is usable to subsequently update or repopulate the respective dynamic field. Alternatively, the dynamic fields may be repopulated periodically (e.g., once a day, once a week, once a month, etc.) or upon the occurrence of an event at the electronic device (e.g., turning on the electronic device 300, opening the book of all things, selecting a heading such as headings 304a-304f, user request to update one or more dynamic electronic items accessible to the device, etc.). In yet another alternative, dynamic fields may be repopulated as new content becomes available (e.g., from an author, publisher, distributor, the Internet, a search engine, etc.). In that case, the content may be pushed to the device or the device may periodically poll information sources for new or updated content.

The book of all things may also include other information associated with each dynamic field, such as a date the dynamic field was created or first populated 310, a date the dynamic field was most recently updated or populated 312, or any other information that may be of interest to a user. In addition to the static headings 304a-304f, the book of all things may include one or more navigation features. In the example shown in FIG. 3, the book of all things includes a navigation pane 314, which identifies a section (e.g., chapter, heading, paragraph, etc.) of the book currently being displayed (in this case the "Personal Directions" section). In other examples, the navigation pane 314 may additionally or alternatively include a page currently being displayed, a total number of pages, a progress indicator of the user's progress through the item, or any other desirable information. Moreover, the book of all things may also allow users to add new headings, columns, rows, or other static information, dynamic fields, and/or modify the layout.

Illustrative Adjunct Reading Ideas

Figure 4:
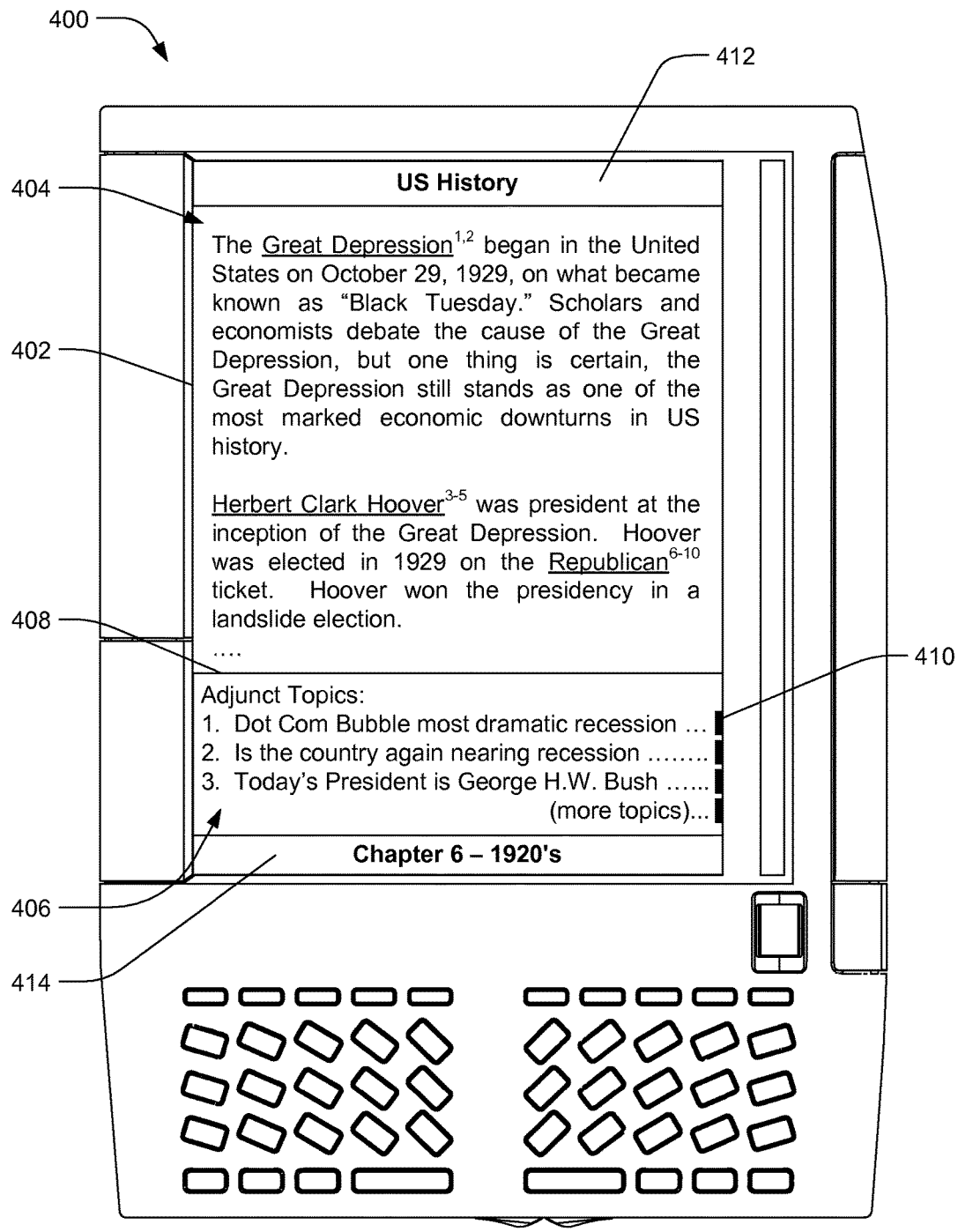
FIG. 4 is a schematic diagram of an illustrative dynamic electronic book presented on an electronic device, with dynamic fields presented adjunct to static information of the electronic book.

FIG. 4 depicts an electronic device, in the form of an electronic book reader or eBook reader 400, presenting a third illustrative dynamic electronic item in a reading pane 402 of the eBook reader 400. The dynamic electronic item concept described in this example is referred to herein as "adjunct reading ideas." Dynamic electronic items using adjunct reading ideas include static information 404 and dynamic fields 406 laid out according to a layout. The dynamic fields 406 are associated with portions of the static information 404, and are configured to be populated with information that is related or adjunct to the associated static information. In this example, the static information 404 includes all of the plain text above a break 408 in the reading pane 402, and the dynamic fields 406 are laid out below the break 408.

Static information having associated dynamic fields may be designated by, for example, underlining, bold text, italicized text, colored text, or any other indication that that differentiates text from surrounding text. For example, in the illustrated embodiment, the terms "Great Depression," "Herbert Clark Hoover," and "Republican" are underlined to indicate that those terms have dynamic fields associated therewith.

The existence of multiple dynamic fields associated with a particular portion of static information may be denoted by a superscript adjacent the static information in the reading pane. In the illustrated example, each of the underlined terms has multiple dynamic fields associated therewith, as indicated by the superscripts adjacent the under lined terms. The dynamic fields 406 in the illustrated example are presented as footnotes to the associated portions of the static information. That is, the phrase "Great Depression" is associated with two dynamic fields numbered 1 and 2 in the list of Adjunct Topics below the break 408. Thus, the phrase "Great Depression" is followed by the superscripts "[1]" and "[2]". These superscripts may be updated dynamically along with the dynamic fields. Alternatively, a number of dynamic fields associated with each portion of static information may be fixed (e.g., at the time of creation), in which case the superscripts could be static.

In the example of FIG. 4, a user may choose to read one of the adjunct reading topics (dynamic fields) by selecting the selector block 410 adjacent the desired adjunct reading topic. The user may select from among additional adjunct reading topics by selecting the selector block adjacent the "more topics" entry.

The static information with which dynamic fields are associated, and the number of dynamic fields associated with each portion of static information, may be fixed at the time the dynamic electronic item is created and/or may be subsequently modifiable by a user. Also, while the dynamic fields 406 in this embodiment are shown as footnotes at the bottom of the page, the dynamic fields 406 may be presented in a variety of other manners. For example, the dynamic fields could be configured to present the adjunct topics to a user upon selection (e.g., by clicking or hovering a cursor over) the static information associated with the dynamic fields. Further, the adjunct topics could be presented to a user in a box overlaid on the static information, in a side column, in a drop down menu, or in any other suitable configuration. Still further, while the dynamic information is shown in this embodiment as textual information, images, audio, video, and/or other information may be used to populate the dynamic fields in this embodiment.

In addition to the reading pane 402, the eBook reader 400 may also present one or more other panes. In the illustrated example, a title pane 412 (with the title of the electronic item) is presented above the reading pane 402 and a section pane 414 (showing chapter number and title) is presented below the reading pane 402.

Illustrative System Usable to Populate Dynamic Electronic Items

Figure 5:
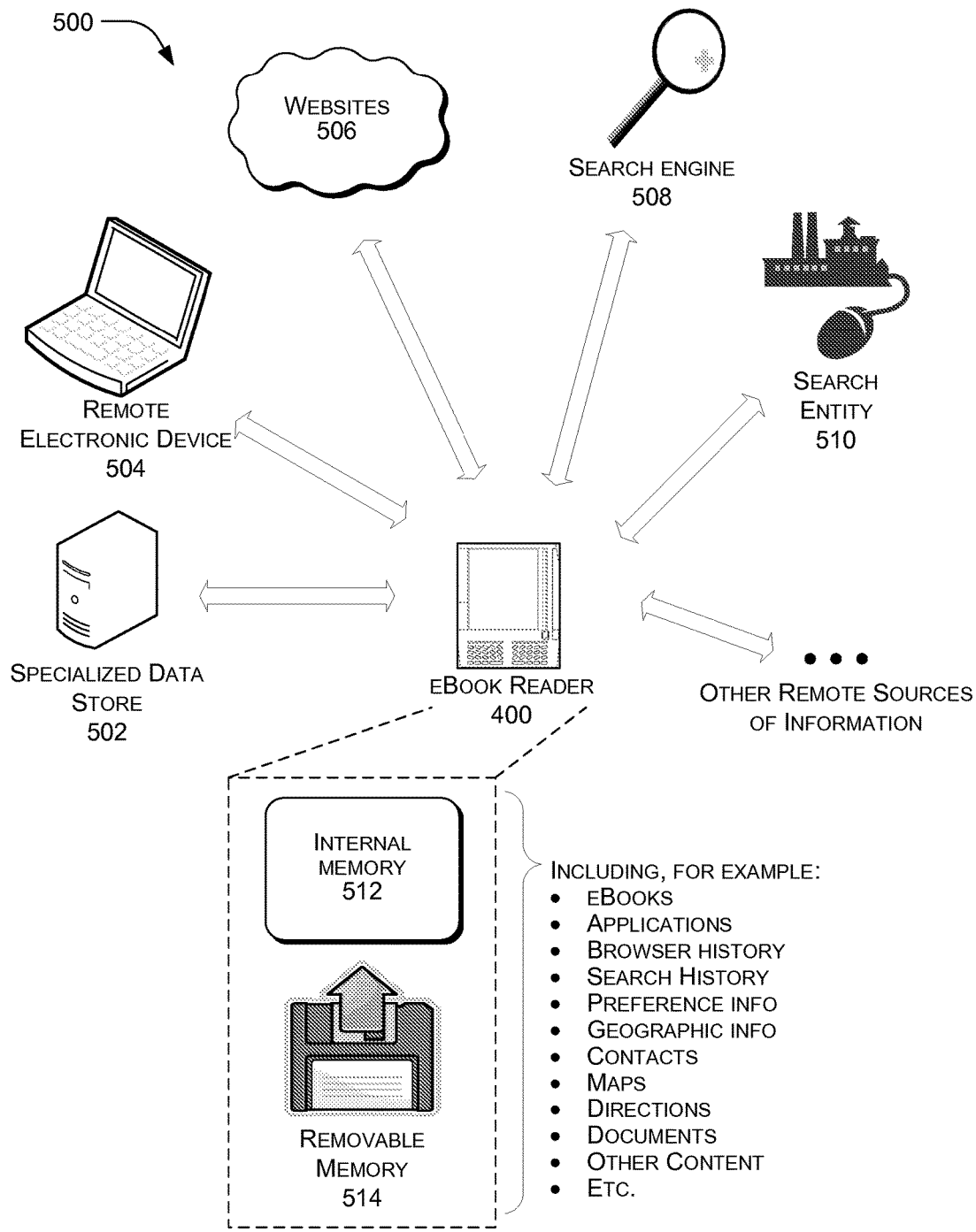
FIG. 5 is a schematic diagram of an illustrative system of information sources accessible by a dynamic electronic item stored on an electronic device.

FIG. 5 shows an illustrative system 500 in which an electronic device, such as the eBook reader 400 of FIG. 4, is in communication with a plurality of local and remote sources of information. Dynamic fields of a dynamic electronic item may be populated from one or more of the sources of information. The eBook reader 400 may connect to the various sources of information via a wired and/or wireless connection. Additionally the connection may be a direct connection (e.g., private, peer-to-peer, etc.) or via a shared network.

The eBook reader 400 is in communication with a variety of remote sources of information including: a specialized data store 502, a remote electronic device 504, one or more websites 506 accessible via a wide area network such as the Internet, a search engine 508, a search entity 510, and one or more other remote sources of information. In addition, the eBook reader 400 has access to internal memory 512 and removable memory 514.

The specialized data store 502 may be hosted by, for example, an author, publisher, or distributor of dynamic electronic items. The host of the specialized data store 502 might regularly update the information in the data store to provide fresh content and promote continued use of the dynamic electronic items. In that case, the host of the specialized data store 502 might charge a subscription fee for accessing the specialized data store 502.

The eBook reader 400 is also in communication with a remote electronic device 504, such as a PC, PDA, eBook reader, or other electronic device. In this example, the dynamic electronic item may be allowed to access some or all of the content on the remote electronic device 504. For example, a user may configure a dynamic electronic item to be able to access shared content on the user's PC or a networked computer. In another example, a teacher may be able to provide test questions to dynamic electronic test books stored on students' laptops, eBook readers, or other electronic devices.

The eBook reader 400 is also in communication with a host of other websites 506 and search engines 508 via a wide area network such as the Internet. The eBook reader 400 may be configured to communicate with one or more specific websites 506 or may use a search engine 508 to search across multiple websites to find information to populate dynamic fields of dynamic electronic items. For example, in FIG. 1, the dynamic electronic item is populated using an image search to populate dynamic field 106h. Alternatively, however, the dynamic field 106h could be populated from a specific website, such as a social networking site, an online dating site, or the like.

The eBook reader 400 is also in communication with a remote search entity 510, such as a crowdsourcing entity. As used herein, crowdsourcing refers to the act of outsourcing a task to an undefined group of people in the form of an open invitation for input. Compensation may or may not be given for completion of the task. In this example, the dynamic fields could be populated by one or more human users via an interface of the search entity 510. In that case, the dynamic fields would typically be populated prior to a user request for presentation of the dynamic field to avoid delay. However, in some instances, the dynamic fields could be populated at the time the user requests to present the dynamic fields. Dynamic fields according to this disclosure may be populated from these and other remote sources of information.

In addition to the foregoing remote sources of information, the eBook reader 400 may have internal and/or removable memory 512, 514. The internal memory 512 and removable memory 514 may store a variety of information usable as a source for populating dynamic electronic items, such as, for example, eBooks (dynamic and otherwise), application programs (e.g., games, word processors, navigation programs, media players, etc.), a browser with associated browsing history, a search tool and associated search history, user preference information, geographic information, contacts, maps, directions, documents, videos, audio files, other content, and the like.

The information sources described with respect to FIG. 5 may additionally or alternatively be used in connection with any of the embodiments of dynamic electronic items described herein. The sources of information shown in FIG. 5 are merely illustrative, and any other local or remote source of information with which the electronic device is capable of communication may additionally or alternatively be used to populate dynamic fields according to this disclosure.

Illustrative Dynamically Populatable Electronic Item

Figure 6:
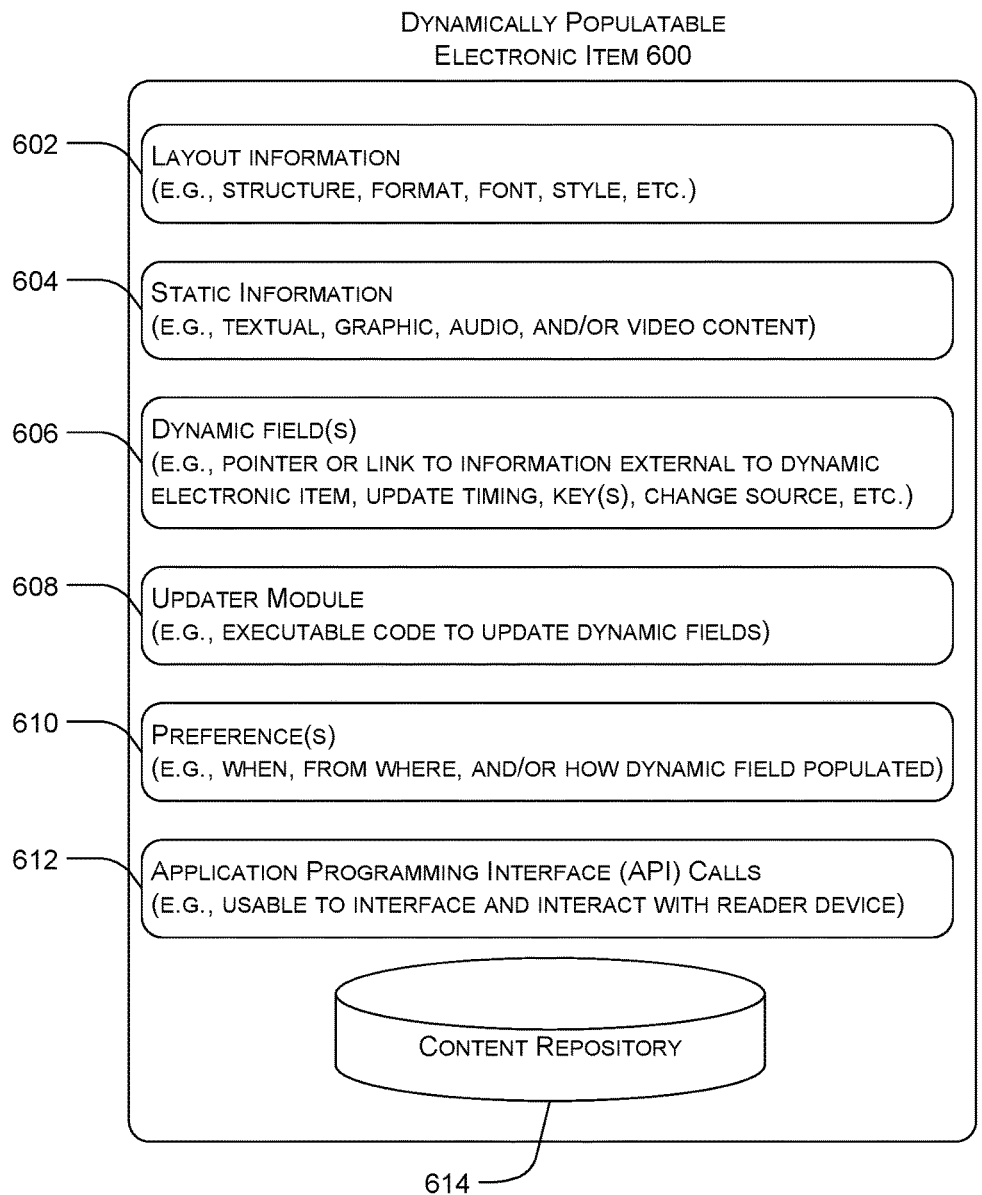
FIG. 6 is a schematic diagram of an illustrative dynamically populatable electronic book.

FIG. 6 is a block diagram of a data structure of an illustrative dynamically populatable electronic item 600 which may, but need not, be used with the electronic devices and systems described herein to implement the techniques described herein. As shown in FIG. 6, the dynamic electronic item 600 comprises layout information 602 defining a layout of static information 604 and one or more dynamic fields 606 in the dynamic electronic item 600. The layout information 602 may define the structure, format, font, style, spacing, orientation, order, and/or any other aspect of how information is laid out in the dynamic electronic item 600.

As discussed above, the static information 604 may include text, graphics, images, audio, video, combinations of these, and/or any other content that is or becomes fixed at the time the electronic item is created or thereafter. In some instances, static information may include only the information provided by the author, publisher, or distributor of the item. In other instances, static information may include information added to the dynamic electronic item subsequent to creation (e.g., by a user of the dynamic electronic item, by an electronic device on which the dynamic electronic item resides, by a source of information, and/or by the dynamic electronic item itself).

The dynamic field(s) 606 may be implemented in a variety of manners. In one implementation, the dynamic fields include a link (e.g., hyper link) or pointer to information external to the dynamic electronic item 600. Additionally or alternatively, pointers may be to information within the dynamic electronic item. For example, a dynamic electronic item may include multiple different endings and the dynamic electronic item might populate an "ending" dynamic field with different information depending on a choice made by the user. The dynamic fields 606 may also include information indicating when the dynamic fields should be populated (e.g., a time interval and/or upon the occurrence of an event). In some implementations, if dynamic fields 606 (or another portion of the dynamic electronic item) may include one or more certificates, passwords, or other security keys to allow the dynamic electronic item 600 to access certain information sources.

Typically, the sources from which a dynamic field is to be populated is constant (that is, the pointer always points to the same source), while the information provided by the source may change over time. However, in other implementations, the source from which a dynamic field is to be populated may change over time and/or based on user input. That is, the link or pointer may actually be configured to update over time or the dynamic field may have several different pointers or links that may be selectively followed depending on the circumstances.

The dynamic electronic item 600 also includes an updater module 608 configured to update the dynamic fields 606. The updater module 608 comprises executable code for updating the dynamic fields 606 at the appropriate time. The updater module 608 may update the dynamic fields 606 periodically, upon occurrence of a predetermined event (e.g., consumption of a portion of the dynamic electronic item comprising the dynamic field, opening the dynamic electronic item, turning on the electronic device, or the like), or both.

In some implementations, the dynamic electronic item 600 may also include user preference information 610. Examples of such user preference information 610 include timing, location, and/or logistics of populating dynamic fields. The preference information 610 may specify a default rule for all dynamic fields, may include individual rules for each dynamic field, or may include a combination both default and individual rules.

The dynamic electronic item 600 may include one or more application programming interface (API) calls 612, which allow the dynamic electronic item 600 to interact with the electronic devices on which it resides. For example, the API calls 612 may allow a host electronic device to execute the dynamic electronic item 600 to populate dynamic fields of the dynamic electronic item 600. The API calls 612 may also allow the dynamic electronic item 600 to invoke features of the electronic device and/or remote devices.

The dynamic electronic item 600 also may include a content repository 614 for storing information. The content repository 614 may store information temporarily, permanently, or both. For example, in the context of the "book of all things" described above, information populated in dynamic fields 306a-306f is then stored in the content repository 614 until overwritten by updated information when a user selects the update icon 308. While the content repository 614 is shown in FIG. 6 as a part of the dynamic electronic item 600, the content repository 614 may additionally or alternatively reside separately from the dynamic electronic item 600. For example, the content repository 614 may reside in local, removable, and/or remote memory accessible by the dynamic electronic item 600.

In one illustrative example, dynamic electronic items may be implemented using tools that facilitate development of dynamic digital content (DDC) to be rendered on a client device with a particular screen configuration. The DDC tools facilitate development of applications for structured presentation via a dynamic markup language (DXyml). The DDC tools and the DXyml markup language enable dynamic digital content designers to specify two-dimensional locations at which to position digital content, including dynamic elements of the digital content, onto a display with a particular screen configuration. The DDC tools may be implemented independently or as a part of a schema via a scripting language. The DXyml markup language specifies an x-coordinate and a y-coordinate for at least each dynamic content element so that the dynamic content element can be placed on a unique pixel of a particular screen configuration. As such, the dynamic markup language is referred to as "DXyml" as it includes instructions to identify "x" and "y" coordinates of a dynamic element, and also uses tags, delimiters, instructions, and other features of a markup language. By coding in a scripting language, developers can access the DDC tools to write applications that utilize DXyml, thereby optimizing the applications for particular platforms having particular screen configurations.

The DDC tools may facilitate creation of dynamic electronic items by including API calls to and from an eBook reader or other electronic device. The API calls facilitate communication of information, such as electronic items available to the electronic device, remaining battery life, communication interface status, services currently available, and global positioning coordinates, etc.

Among other features, content written in the DXyml markup language does not need to be executed in a particular order (as a conventional browser might execute html) because the layout is defined before the content is served. In certain implementations, text elements and other non-image elements can be rendered first on the display, followed subsequently by the rendering of image elements. Further, more than one screen's worth of content may be provided in batch to the devices to allow a user to navigate through multiple screens before seeking additional content. The next batch of content may be fetched automatically in advance of the user requesting the additional content. In this way, any latency of downloading the content to the client device can be masked by the pre-fetching of additional content based on what the user is likely to request next.

Additional details of DDC tools and DXyml can be found in copending U.S. patent application Ser. No. 12/060,167, filed Mar. 31, 2008, concurrently with the instant application, and entitled "DYNAMIC DISPLAY DEPENDENT MARKUP LANGUAGE INTERFACE."

Illustrative Electronic Device

Figure 7:
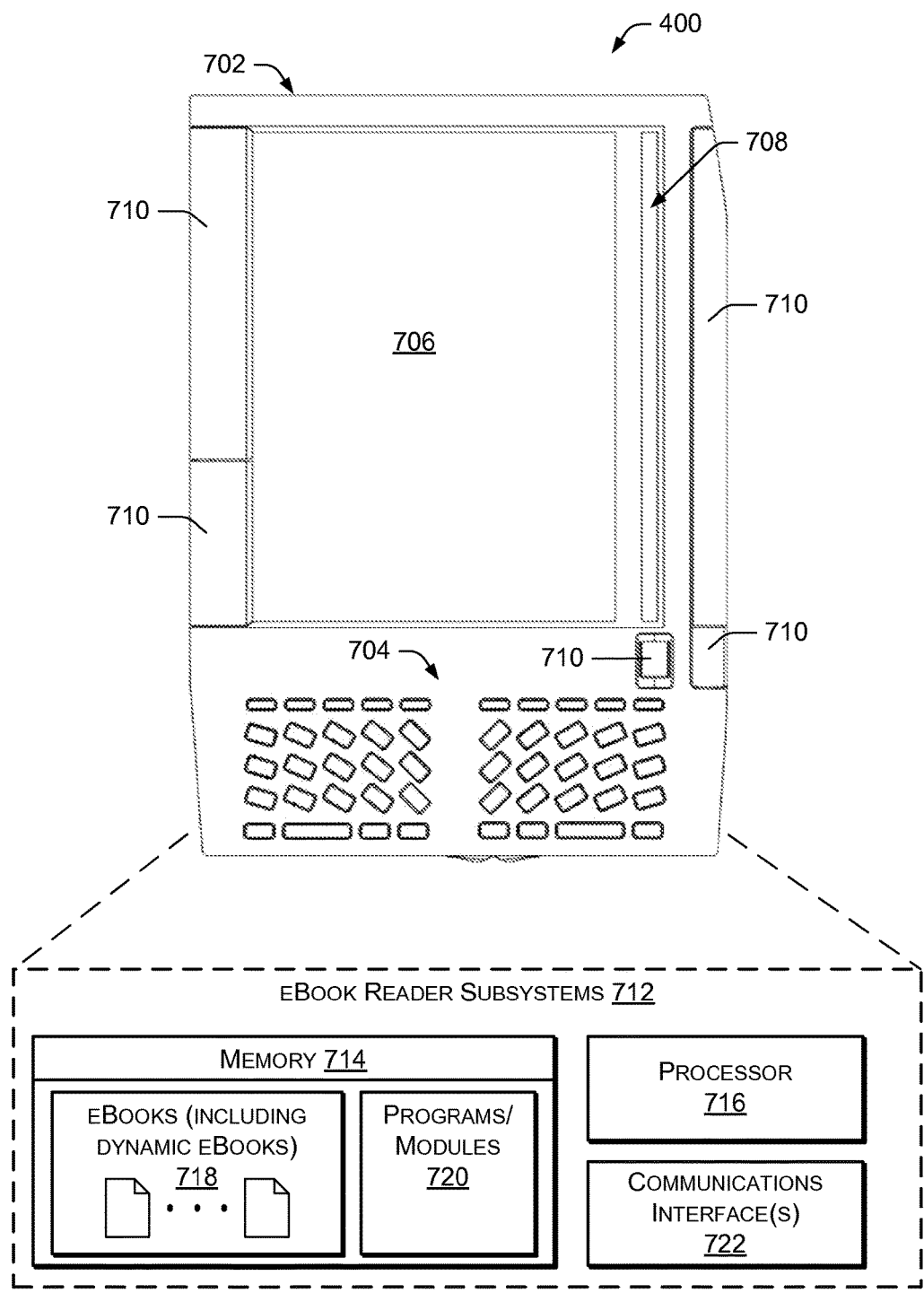
FIG. 7 is a schematic diagram of the electronic device of FIG. 4, showing illustrative subsystems of the electronic device.

FIG. 7 illustrates additional details of the illustrative electronic device 400 shown in FIG. 4. The electronic device 400 of this implementation comprises a handheld eBook reader. Various features of the eBook reader 400 are described briefly below. As shown in FIG. 7, the eBook reader 400 has a body or housing 702, a keyboard 704, and a dual display system comprised of a first display 706 and a second display 708. The device keyboard 704 includes a plurality of alphabetic, numeric, and/or function keys for entry of user input.

The first display 706 in the dual display system presents content in a human-readable format to the user. Electronic items (dynamic or otherwise) may be presented in the first display 706. In the context of eBooks, the display 706 provides the text of electronic books and also depicts any illustrations, tables, or graphic elements that might be contained in the eBooks.

The second display 708 of the dual display system is a narrow screen located adjacent to the content display 706. The narrow display 708 is illustrated as being positioned to the right of the content display 706, although it may be located elsewhere in the housing 702 in other implementations. The narrow display screen 708 may be responsive to user input registered via, for example, a finger, a stylus, or other similar pointing device. Additionally, the narrow display screen 708 may enable presentation of graphic elements (e.g., selection blocks like those shown in FIG. 4) that correspond to content displayed in the content display 706.

The eBook reader 400 may also include a variety of user inputs 710 to navigate through and among eBooks and other electronic items. Examples of user inputs that may be present include buttons, scroll wheels, thumb wheels, thumb sticks, sensors that detect and register movement of a user's thumb or finger, tactile sensors, or any other conventional user input mechanism.

The eBook reader 400 also has various internal components, which are referred to generally as eBook reader subsystems 712. In one implementation, the subsystems 712 include memory 714 and a processor 716. The processor 716 interacts with the memory 714 to facilitate operation of the eBook reader device 400. The memory 714 may be used to store a plurality of eBooks 718 (dynamic and otherwise) and other electronic items, as well as software programs or other executable modules 720 that may be executed by the processor. Examples of such programs or modules might include indexing modules for indexing eBooks, reader programs, control modules (e.g., power management), communication interface modules, network connection software, operating models, display drivers, sensor algorithms, page turn detectors, and the like.

The memory 714 may include volatile memory (such as RAM), nonvolatile memory, removable memory, and/or non-removable memory, implemented in any method or technology for storage of information, such as computer-readable instructions, data structures, program modules, or other data. Also, the processor 716 may include onboard memory in addition to or instead of the memory 714.

The eBook reader subsystems 712 also include communications interfaces 722, which may include suitable hardware and/or software, for wired and/or wireless communication with one or more remote sources of information. The communications interfaces 722 may interact with, or be implemented at least partially by, communication interface modules and/or network connection software residing in memory of the eBook reader 400.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer-readable media.

Illustrative Method of Creating Dynamically Populatable Electronic Items

Figure 8:
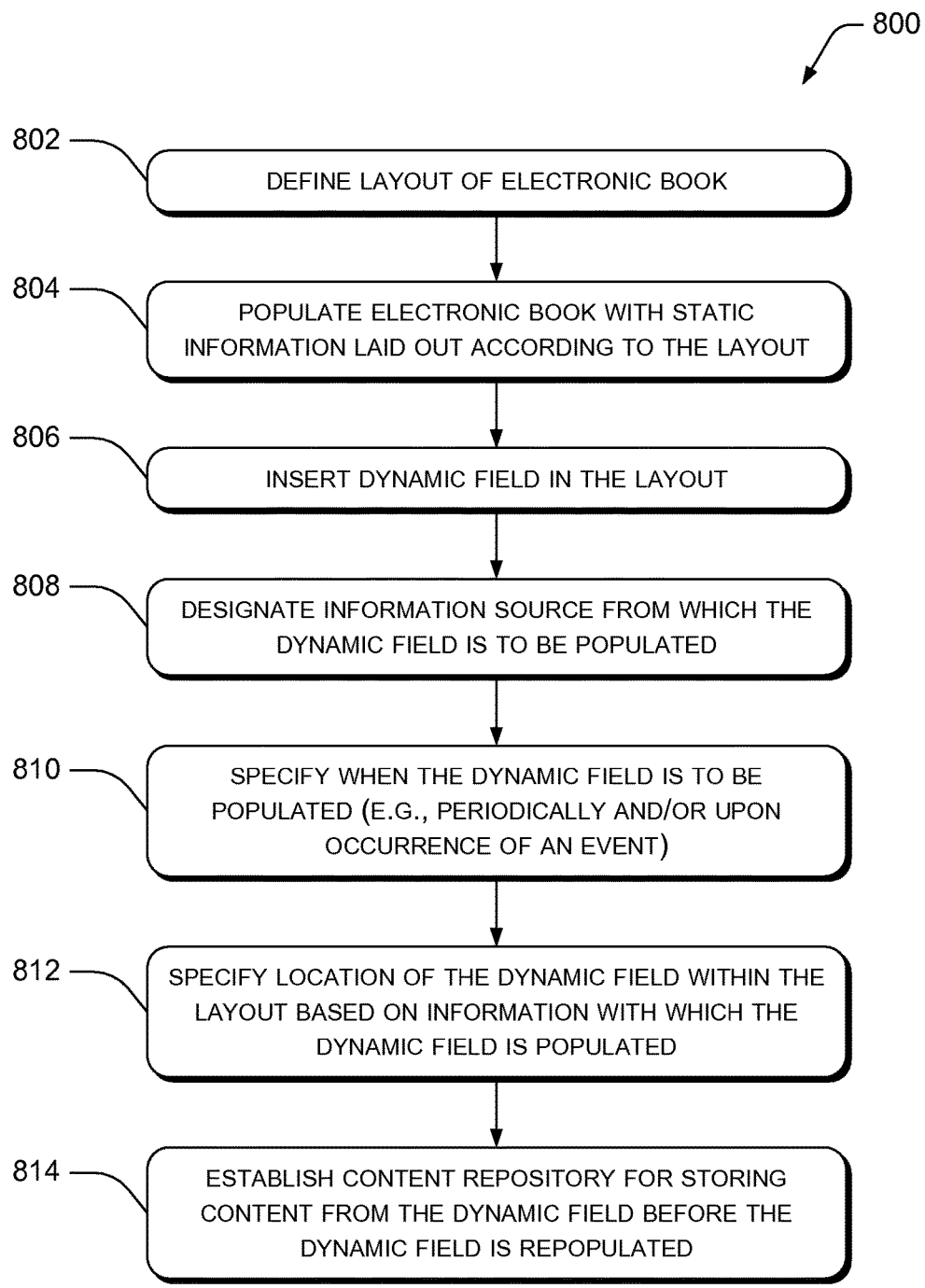
FIG. 8 is a flowchart of an illustrative method of creating a dynamically populatable electronic item.

Various dynamically populatable electronic items are described above. FIG. 8 is a flowchart showing one illustrative method 800 of creating dynamically populatable electronic items such as, but not limited to, those shown in FIGS. 1-4 and 6. The method 800 will be described in the context of creating a dynamic item such as that shown in FIG. 6 for convenience and clarity, but may be used to create other types of dynamic electronic items.

Creation of a dynamic eBook begins with defining a layout of the eBook at 802 and, at 804, populating the eBook with static information. The static information may comprise virtually any text, images, audio, video, or other content that is stored at the time of creation.

At 806, one or more dynamic fields are inserted in the layout. A source is then designated, at 808, from which the dynamic field is to be populated. At 810, a trigger is specified when the dynamic field is to be populated. In various implementations, the trigger may specify that the dynamic fields are to be updated at predetermined time intervals, upon the occurrence of certain events, or a combination of these.

In some implementations, the dynamic fields are fixed within the layout of the dynamic electronic item. However, in other implementations, at 812, a conditional location of the dynamic field within the layout may be specified, such that the location of the dynamic field within the eBook depends on information with which the dynamic field is populated. For example, if the dynamic field is populated with an image, the dynamic field may be positioned in an image column (e.g., column 110 in FIG. 1), while if the dynamic field is populated with text it may be positioned in a text column (e.g., column 108 in FIG. 1).

Also, in some implementations, a content repository may be established, at 814, to store content from one or more dynamic fields before those fields are repopulated.

The foregoing is but one illustrative method of creating a dynamic electronic item.

Illustrative Method of Dynamically Populating Electronic Items

Figure 9:
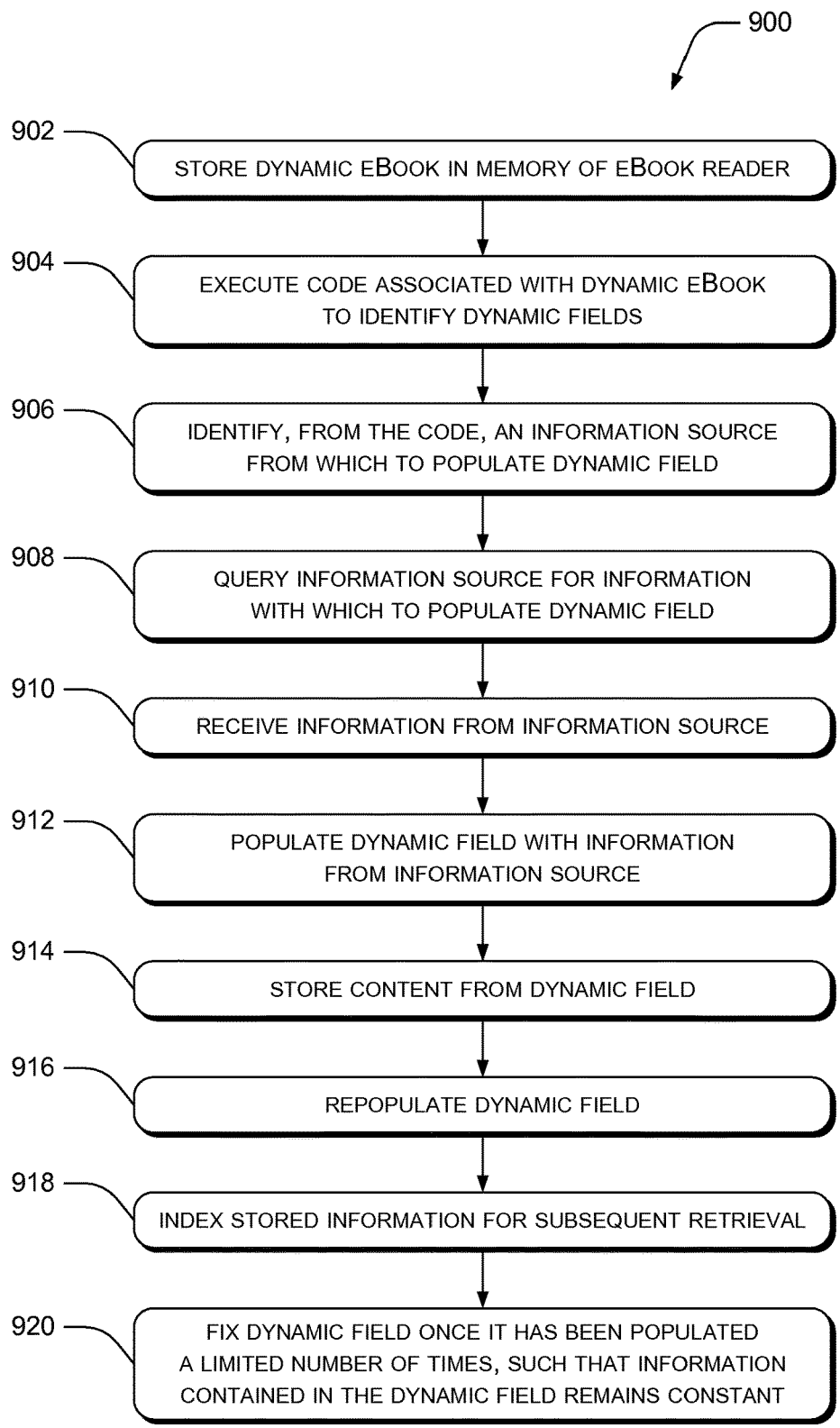
FIG. 9 is a flowchart of an illustrative method of dynamically populating an electronic item with information.

FIG. 9 is a flowchart showing one illustrative method 900 of dynamically populating electronic items such as, but not limited to, those shown in FIGS. 1-4 and 6. The method 900 will be described in the context of populating a dynamic eBook such as that shown in FIG. 6 for convenience and clarity, but may be used to populate other types of dynamic electronic items.

At 902, a dynamic eBook is stored in memory of an electronic device. When the dynamic eBook is opened, code associated with the dynamic eBook is executed, at 904, to identify dynamic fields in the eBook. The eBook reader is able, at 906, to identify sources of information from which to populate the dynamic fields based on the code.

At 908, the eBook reader queries the information source for information with which to populate the dynamic field and, at 910, receives the requested information. The eBook reader then, at 912, populates the dynamic field with the received information according to the instructions in the code associated with the dynamic field. Populating the dynamic field may be performed in response to receipt of user input requesting presentation of a page of content containing the dynamic field. Additionally or alternatively, populating the dynamic field may be performed automatically upon the occurrence of one or more of the following:
opening a file associated with the electronic item;
passage of a predetermined period of time;
purchase of the electronic item;
receipt of the electronic item at the electronic device;
receipt of other electronic items at the electronic device;
installation of a program on the electronic device; and/or
access of a web page by the electronic device.

In some implementations, content from dynamic field is stored, at 914, before the dynamic field is repopulated at 916.

Additionally, in some implementations, information from the dynamic fields may be indexed, at 918, for subsequent retrieval (e.g., by browsing or searching). Also, in some implementations, at 920, dynamic fields may be fixed against further modification once they have been populated a predetermined limited number of times. After being fixed, information contained in dynamic fields remains the same. In other implementations dynamic fields may be populated an unlimited number of times.

Any of the acts of any of the methods described herein may be implemented at least partially by a processor or other electronic device based on instructions stored on one or more computer-readable media. Computer-readable media can be any available media that can be accessed by electronic devices or dynamic electronic items, as appropriate. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by electronic devices or dynamic electronic items. Combinations of any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method of generating a dynamic electronic book, the method implemented at least in part by an electronic device of a user, the method comprising:
defining a layout of the electronic book;
populating the electronic book, at a time of generation, with static information laid out according to the layout;
inserting a dynamic field in the layout of the electronic book at the time of generation, the dynamic field configured to be subsequently dynamically populated with information from a remote information source separate from the electronic book and remote from the electronic device, the layout defining, at least in part, a relative position of the static information and dynamic fields on a display;

designating the remote information source from which the dynamic field of the electronic book is to be subsequently populated, wherein the remote information source from which the dynamic field is to be populated changes over time;

specifying a timing or an event to cause the dynamic field of the electronic book to be populated; and defining instructions executable by a processor of the electronic device of the user for:
  obtaining the information from the remote information source to populate the dynamic field in response to an occurrence of the timing or the event; and
  changing the remote information source from which the dynamic field is to be populated from the designated remote information source to a different remote information source.

2. The method of claim 1, wherein the dynamic field is inline with the static information, such that the dynamic field is to be populated with information that fills in a blank in the static information.

3. The method of claim 1, further comprising:
  following populating of the dynamic field with the information from the remote information source, storing content corresponding to the dynamic field in a content repository before the dynamic field is subsequently repopulated; and
  adding a new dynamic field to the electronic book in addition to the dynamic field, a position of the new dynamic field in the layout of the electronic book determined based, at least in part, on the position of the populated dynamic field in the layout of the electronic book.

4. The method of claim 1, wherein the dynamic field is adjunct to the static information, such that the dynamic field is to be populated with information that is ancillary to the static information.

5. A method of generating a dynamic electronic item, the method comprising:
  defining a layout of an electronic item;
  populating the electronic item with static information laid out according to the layout;
  inserting a dynamic field in the layout, the dynamic field configured to be dynamically populated with information from an information source separate from the electronic item, the layout defining, at least in part, a relative position of the static information and the dynamic field on a display;
  designating the information source from which the dynamic field is to be populated;
  specifying a timing at which the dynamic field is to be repopulated upon passage of a predetermined period of time; and
  based at least in part on a populating of the dynamic field with the information from the information source, adding a new dynamic field to the layout of the electronic item in addition to the populated dynamic field, a position of the new dynamic field in the layout of the electronic item determined based, at least in part, on the position of the populated dynamic field in the layout of the electronic item.

6. The method of claim 5, wherein the information source from which the dynamic field is to be populated is constant, while the information provided by the information source changes over time.

7. The method of claim 5, wherein the information source from which the dynamic field is to be populated changes over time.

8. The method of claim 5, wherein the information source from which the dynamic field is to be populated comprises at least one of the following:
  a log of search results;
  a log of search queries;
  a log of electronic items stored in memory;
  a computer-generated data store;
  a user-generated data store;
  one or more other programs in memory;
  a list of tags;
  a website; or
  the Internet.

9. The method of claim 5, wherein the electronic item comprises an electronic book, and the dynamic field of the electronic book is specified to be repopulated with updated information upon passage of the predetermined period of time.

10. The method of claim 5, wherein the dynamic field is movable, such that a location of the dynamic field relative to the static information is dependent on information with which the dynamic field is populated.

11. A non-transitory computer-readable medium maintaining instructions executable on a processor of an electronic device of a user for providing a dynamically populatable electronic book comprising:
  structural information defining a layout of the electronic book;
  static information laid out according to the structural information;
  a dynamic field laid out according to the structural information, the dynamic field configured to be dynamically populated with information from a remote information source separate from the electronic book and remote from the electronic device, the layout defining, at least in part, a relative position of the static information and the dynamic field on a display, wherein the dynamic field is inline within text information of the static information, such that the dynamic field is to be populated with information that fills in a blank in the text of the static information; and
  an updater module configured to, when executed by the processor of the electronic device of the user consuming the electronic book, communicate with the remote information source and update the dynamic field with updated information from the remote information source upon consumption of a portion of the electronic book comprising the dynamic field.

12. The computer-readable medium as recited in claim 11, further comprising a preference module for modifying at least one of:
  the information source used to populate the dynamic field; or
  a timing when the dynamic field is to be populated.

13. The computer-readable medium as recited in claim 11, further comprising a call for an application programming interface (API) by which the electronic book is configured to issue commands recognizable by an electronic book reader.

14. The computer-readable medium as recited in claim 11, further comprising instructions configuring the electronic device to periodically poll the remote information source for updated content.

* * * * *